United States Patent
Cookson et al.

(10) Patent No.: US 9,840,602 B2
(45) Date of Patent: *Dec. 12, 2017

(54) PIPA POLYOL BASED CONVENTIONAL FLEXIBLE FOAM

(71) Applicant: Dow Global Technologies LLC, Midland, MI (US)

(72) Inventors: Paul A. Cookson, Samstagern (CH); Irena Amici-Kroutilova, Waedenswil (CH); Alberto Lora Lamia, Waedenswil (CH); Francois Casati, Pfaffikon (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/917,000

(22) PCT Filed: Sep. 11, 2014

(86) PCT No.: PCT/US2014/055264
§ 371 (c)(1),
(2) Date: Mar. 5, 2016

(87) PCT Pub. No.: WO2015/038827
PCT Pub. Date: Mar. 19, 2015

(65) Prior Publication Data
US 2016/0208040 A1    Jul. 21, 2016

Related U.S. Application Data

(60) Provisional application No. 61/877,287, filed on Sep. 13, 2013, provisional application No. 61/877,290, filed on Sep. 13, 2013, provisional application No. 61/919,983, filed on Dec. 23, 2013, provisional application No. 61/954,137, filed on Mar. 17, 2014, provisional application No. 61/954,259, filed on Mar. 17, 2014.

(51) Int. Cl.

| | | |
|---|---|---|
| *C08J 9/00* | (2006.01) | |
| *C08G 18/76* | (2006.01) | |
| *C08J 9/14* | (2006.01) | |
| *C08K 5/00* | (2006.01) | |
| *C08G 18/08* | (2006.01) | |
| *C08G 18/24* | (2006.01) | |
| *C08G 18/32* | (2006.01) | |
| *C08G 18/40* | (2006.01) | |
| *C08G 18/16* | (2006.01) | |
| *C08G 18/18* | (2006.01) | |
| *C08G 18/22* | (2006.01) | |
| *C08G 18/48* | (2006.01) | |
| *C08G 18/62* | (2006.01) | |
| *C08G 18/78* | (2006.01) | |
| *C08G 101/00* | (2006.01) | |

(52) U.S. Cl.
CPC ........ *C08J 9/0061* (2013.01); *C08G 18/0876* (2013.01); *C08G 18/14* (2013.01); *C08G 18/165* (2013.01); *C08G 18/1808* (2013.01); *C08G 18/222* (2013.01); *C08G 18/244* (2013.01); *C08G 18/3281* (2013.01); *C08G 18/409* (2013.01); *C08G 18/4829* (2013.01); *C08G 18/6262* (2013.01); *C08G 18/7621* (2013.01); *C08J 9/0004* (2013.01); *C08J 9/145* (2013.01); *C08K 5/0066* (2013.01); *C08G 18/7806* (2013.01); *C08G 2101/005* (2013.01); *C08G 2101/0008* (2013.01); *C08G 2101/0083* (2013.01); *C08J 2375/04* (2013.01); *C08J 2475/04* (2013.01)

(58) Field of Classification Search
CPC .......................... C08G 18/409; C08G 18/7806
See application file for complete search history.

(56) References Cited

U.S. PATENT DOCUMENTS

| | | |
|---|---|---|
| 4,093,569 A | 6/1978 | Reischl |
| 4,293,470 A | 10/1981 | Cuscurida |

(Continued)

FOREIGN PATENT DOCUMENTS

| | | |
|---|---|---|
| DE | 19811471 A | 9/1999 |
| EP | 56581 A | 7/1982 |
| EP | 56582 A | 7/1982 |
| EP | 072096 A | 2/1983 |
| EP | 079115 A | 5/1983 |
| EP | 129977 A | 6/1983 |
| EP | 776922 A | 6/1997 |
| GB | 2072204 A | 9/1981 |
| WO | 1992/02567 A | 2/1992 |

(Continued)

Primary Examiner — Melissa Rioja

(57) ABSTRACT

A process for forming a conventional flexible polyurethane foam includes providing a polyol component including a PIPA polyol that is a dispersion having a solids content from 10% to 75 wt %, based on a total weight of the PIPA polyol, providing an isocyanate component that includes at least one polyisocyanate, providing an additive component that includes a catalyst, and forming a reaction mixture including the polyol component, the isocyanate component, and the additive component to form a flexible polyurethane foam with a resiliency value below 45%. The reaction mixture has an isocyanate index from 90 to 150. The PIPA polyol is a reaction product of a mixture including at least a low equivalent weight polyol having a number average hydroxyl equivalent weight of less than 80, a polyisocyanate compound having a number average isocyanate equivalent weight that is less than 225, and a liquid base poly ether polyol having a number average hydroxyl equivalent weight from 200 to 1500 and at least 80% of secondary hydroxyl groups based on a total amount of hydroxyl groups in the liquid base polyether polyol.

9 Claims, No Drawings

(56) References Cited

U.S. PATENT DOCUMENTS

| | | |
|---|---|---|
| 4,296,213 A | 10/1981 | Cuscurida |
| 4,305,857 A | 12/1981 | Reischl |
| 4,310,448 A | 6/1982 | Reischl |
| 4,310,449 A | 6/1982 | Reischl |
| 4,374,209 A | 2/1983 | Rowlands |
| 4,452,923 A | 6/1984 | Carroll |
| 4,518,778 A | 5/1985 | Cuscurida |
| 4,523,025 A | 6/1985 | Cuscurida |
| 5,157,074 A | 10/1992 | Metzger |
| 6,506,813 B1 | 1/2003 | Parfondry |
| 7,947,756 B2 | 5/2011 | Andries |
| 8,318,823 B2 | 11/2012 | Triouleyre |
| 2006/0058410 A1 | 3/2006 | Yu et al. |
| 2007/0238796 A1 | 10/2007 | Lovenich |
| 2007/0282029 A1* | 12/2007 | Hager ................ C08G 18/4072 521/172 |
| 2008/0300338 A1 | 12/2008 | Wagner |
| 2010/0105833 A1 | 4/2010 | Keller |
| 2012/0101181 A1* | 4/2012 | Munshi ............. C08G 18/0876 521/157 |

FOREIGN PATENT DOCUMENTS

| | | | |
|---|---|---|---|
| WO | WO 9960045 A1 * | 11/1999 | ......... C08G 18/4072 |
| WO | 00/73364 A | 12/2000 | |
| WO | 2003/016373 A | 2/2003 | |
| WO | 2008116605 A | 10/2008 | |
| WO | 2010/151431 A | 12/2010 | |
| WO | 2012/154820 A | 11/2012 | |
| WO | 2012/154831 A | 11/2012 | |
| WO | 2013/148252 A | 10/2013 | |
| WO | 2014/037558 A | 3/2014 | |

* cited by examiner

PIPA POLYOL BASED CONVENTIONAL FLEXIBLE FOAM

FIELD

Embodiments relate to a conventional flexible polyurethane foam made using a polyisocyanate polyaddition dispersion.

INTRODUCTION

Polymer polyols have a continuous phase in which a base polyol has solid particles dispersed therein. When the polymer polyol is used to make conventional flexible polyurethane foam, the dispersed particles may help to form open cells and to increase the load-bearing properties of the resultant foam. Examples of polymer polyols include styrene-acrylonitrile (SAN) polyols that are dispersions of styrene-acrylonitrile and polyisocyanate polyaddition (PIPA) polyols that are dispersions of polyurethane-urea particles or Polyurea (PHD) polyols that are dispersion of amines reacted with polyisocyanates.

While SANs polyols are widely used to form conventional flexible polyurethane foam, the use of SANs polyols also leads to an undesired higher volatile organic compounds (VOC) content and/or odor due to the styrene-acrylonitrile monomer content. PIPA polyols often contain mainly primary hydroxyl groups (e.g., as discussed in paragraph [0024] of U.S. Patent Publication No. 2006/0058410), long propylene oxide chains capped with ethylene oxide, and equivalent weights higher than 1,600, which is a significant limitation on the types of PIPA polyol products that can be produced and the types of applications in which those PIPA polyols can be used, excluding thus conventional flexible foams with resiliency values under 45% (which may represent about two third of the flexible foam market). Accordingly, it is sought to form conventional flexible polyurethane foams using a polymer polyol having mainly secondary hydroxyl groups (i.e., at least 80% of a total amount of hydroxyl groups are secondary hydroxyl groups), since polyols having mainly primary hydroxyl groups are disfavored due to their reactivity profile and sensitivity to the levels of tin based catalysts. Further, formulations that reduce VOC content and/or odor in conventional flexible polyurethane foams and methods for forming the flexible polyurethane foams with the reduced VOC content are sought.

While U.S. Pat. No. 4,374,209 includes examples of polyurethane foam made using a PIPA polyol based on secondary hydroxyl based carrier polyol and diethanolamine, no indication is given of the final product viscosity and particle size distribution. EP 776,922 also includes an example of a dispersion in which the base polyol contains mainly secondary hydroxyl groups and triethanolamine is used as a reactant to make the polyurethane particles, but does not provide particle size or dispersion stability information. These approaches have failed to lead to successful commercial production of a PIPA polyol in which the base polyol has mainly secondary hydroxyl groups. WO 2014/037558 also includes an example of a PIPA dispersion in which the base polyol contains 90% secondary hydroxyl groups, but like EP 776,922 does not provide particle size or dispersion stability information.

SUMMARY

Embodiments may be realized by providing a process for forming a conventional flexible polyurethane foam that includes providing a polyol component including a PIPA polyol that is a dispersion having a solids content from 10% to 75 wt %, based on a total weight of the PIPA polyol, providing an isocyanate component that includes at least one polyisocyanate, providing an additive component that includes a catalyst, and forming a reaction mixture including the polyol component, the isocyanate component, and the additive component to form a flexible polyurethane foam with a resiliency value below 45%. The reaction mixture has an isocyanate index from 90 to 150. The PIPA polyol is a reaction product of a mixture including at least a low equivalent weight polyol having a number average hydroxyl equivalent weight of less than 80, a polyisocyanate compound having a number average isocyanate equivalent weight that is less than 225, and a liquid base polyether polyol having a number average hydroxyl equivalent weight from 200 to 1500 and at least 80% of secondary hydroxyl groups based on a total amount of hydroxyl groups in the liquid base polyether polyol.

DETAILED DESCRIPTION

Embodiments relate to polyisocyanate polyaddition (PIPA) polyols that are polymer polyols useable for forming conventional flexible polyurethane foams, e.g., that are used in the manufacturing of bedding and furniture (e.g., seat cushions, backrests, pillows, and mattresses) and carpet underlay.

The PIPA polyol is a dispersion including a reaction product of a low equivalent weight polyol having a number average hydroxyl equivalent weight of less than 80 with a polyisocyanate having a number isocyanate equivalent weight that is less than 225, (to form a polyurethane or polyurethane-urea bonds) dispersed in a base, or carrier, polyol having a number average hydroxyl equivalent weight of at least 200 and at most 1,500 with at least 80% of secondary hydroxyl groups based on a total amount of hydroxyl groups in the liquid base polyether polyol. The reaction may be performed in situ, while the polyol and polyisocyanate reactants are dispersed or dissolved in the base polyol, of which hydroxyl groups in both the low equivalent weight polyol and the base polyol are reactive with isocyanate groups in the polyisocyanate. The reaction between the base polyol and the polyisocyanate may result in grafting that stabilizes the PIPA polyols. However, an excessive amount or grafting could result in a highly viscous product that contains little or no dispersed polymer phase. Accordingly, when forming the PIPA polyol, the reaction that forms the polyurethane or polyurethane-urea bonds should be balanced with the grafting reaction, e.g., by selecting a low equivalent weight polyol that is more reactive toward isocyanate groups than the base polyol while still providing a sufficient amount of grafting to form a stable PIPA polyol and optionally through the selection of the proper catalyst and of its level in the reactants and/or a stabilizer for the PIPA particles. The PIPA polyol may be produced without using any seed PIPA dispersions (e.g., use of a seed PIPA dispersion that has mainly primary hydroxyl groups to make a second PIPA dispersion with reduced primary hydroxyl group content may be excluded).

According to embodiments, the PIPA polyol used to make conventional flexible polyurethane foam is prepared by reacting at least a low equivalent weight polyol with a polyisocyanate compound and the reaction product thereof is dispersed in the base polyol, e.g., as discussed in U.S. Provisional Application No. 61/877,287 (filed on Sep. 13, 2013) and in U.S. Provisional Application No. 61/877,290

(filed on Sep. 13, 2013). For example, the base polyol may be a polyoxypropylene carrier polyol or a polyoxypropylene-polyoxyethylene carrier polyol having a low ethylene oxide content (e.g., less than 12 wt % based on a mixed feed). The PIPA polyol has at least 80% of secondary hydroxyl groups, based on a total amount (e.g., by number or weight) of hydroxyl groups, and is produced in an effective and cost-efficient process. For example, the PIPA polyol may have at least 90% of secondary hydroxyl groups.

The PIPA polyol may be used to make flexible foam using a slabstock foam forming process (e.g., a slabstock foaming process known in the art may be used), in which process the PIPA polyol is reacted with a foam forming polyisocyanate component in the presence of foam forming additive component (e.g., that includes additives such as a blowing agent, a surfactant, and/or a catalyst). A strong gelling catalyst may be used since the PIPA polyol contains mostly secondary hydroxyls, hence has low reactivity towards the polyisocyanate during foaming. In the slabstock foaming process, starting materials that include the PIPA polyol and the foam forming polyisocyanate component (and may include at least a portion of the optional foam forming additive component) may be mixed and dispensed into a region (e.g., a trough), in which the starting materials react and rise without constraint or under minimal constraint (such as the weight of an overlying plastic film). The PIPA polyol is not limited to use in a slabstock foaming process, e.g., a polyurethane foam may be formed in a closed or open mold (e.g., a closed or open mold process known to one skilled in the art may be used), in which the starting materials react and rise with the constraint of an open or closed molding structure.

To form the flexible polyurethane foam, a foam forming polyol component that includes at least the PIPA polyol is reacted with the foam forming polyisocyanate component that includes at least one polyisocyanate compound. The reaction occurs in the presence of the foam forming additive component that may include a blowing and/or a gelling catalyst, a surfactant, a blowing agent, and/or a flame retardant. For example, the conventional flexible polyurethane foam may be prepared at an isocyanate index that is from 95 to 150 (e.g., 95 to 130, 100 to 125, 105 to 115, etc.). The isocyanate index is measured as the equivalents of isocyanate in the reaction mixture for forming the flexible foam, divided by the total equivalents of isocyanate-reactive hydrogen containing materials in the reaction mixture, multiplied by 100.

The PIPA polyol has a solids content from 10 wt % to 75 wt % (e.g., 15 wt % to 50 wt %, 10 wt % to 40 wt %, 15 wt % to 40 wt %, 20 wt % to 40 wt %, 25 wt % to 45 wt %, 15 wt % to 30 wt %, 15 wt % to 25 wt %, etc.), based on the total weight of the PIPA polyol. Solids content refers to the weight of the PIPA particles as a percentage of the total weight of the dispersion. The weight of the PIPA particles may be a calculated weight determined according to methods known in the art. The PIPA polyol is a reaction product of a mixture including at least the low equivalent weight polyol, the polyisocyanate compound, and the base polyol. The amount of the PIPA polyol in the foam forming polyol component may be at least 5 wt % (e.g., from 5 wt % to 100 wt %, 8 wt % to 15 wt %, 12 wt % to 20 wt %, 18 wt % to 28 wt %, 26 wt % to 50 wt %, 26 wt % to 80 wt %, 50 wt % to 100 wt %, from 60 wt % to 100 wt %, from 70 wt % to 100 wt %, from 80 wt % to 100 wt %, from 90 wt % to 100 wt %, from 95 wt % to 100 wt %, from 98 wt % to 100 wt %, etc.), based on a total weight of the foam forming polyol component. For example, the amount of the PIPA polyol in the foam forming polyol component may be at least 6 wt % near a higher solids content of 75 wt % and may be at least 20 wt % near a lower solids content of 20 wt %, based on a total weight of the foam forming polyol component. The dispersed PIPA particles may have a particle diameter in the range of 0.05 μm to 20 μm. For example, at least 90% of a total amount of the PIPA particles may have a particle size of less than 10 μm (e.g., 0.05 μm to 9 μm, 0.05 μm to 5 μm, etc.).

In addition to the PIPA polyol, the foam forming polyol component may include at least one polyether polyol derived from propylene oxide, ethylene oxide, and/or butylene oxide. For example, the foam forming polyol component may include a polyoxypropylene-polyoxyethylene polyether triol having a molecular weight from 3000 g/mole to 3500 g/mole. The polyoxypropylene-polyoxyethylene polyether triol may have an ethylene oxide content that is less than 15% (with the remainder being propylene oxide) and have less than 20% primary hydroxyl groups (e.g., less than 10% primary hydroxyl groups), based on the total number of hydroxyl groups in the polyoxypropylene-polyoxyethylene polyether triol. The overall solids content of the foam forming polyol component is adjusted by the inclusion of the at least one polyether polyol, e.g., so that the overall solids content is from 2 wt % to 50 wt % (e.g., 2 wt % to 30 wt %, 5 wt % to 25 wt %, 7 wt % to 20 wt %, etc.). For example, if the foam forming polyol component includes 50 wt % of the PIPA polyol having the solids content from 15 wt % to 25 wt % and 50 wt % of a polyether polyol, an overall solids content of the foam forming polyol component is from 7.5 wt % to 12.5 wt %, based on a total weight of the foam forming polyol component. According to exemplary embodiments, the overall solids content of the foam forming polyol component is from 7.5 wt % to 25 wt %.

The foam forming polyisocyanate component includes at least one polyisocyanate compound. The polyisocyanate compound is an aromatic, a cycloaliphatic, or an aliphatic polyisocyanate. Exemplary polyisocyanate compounds include m-phenylene diisocyanate (MDI), toluene diisocyanate (TDI), hexamethylene diisocyanate (HDI), tetramethylene diisocyanate, cyclohexan diisocyanate, hexahydrotoluene diisocyanate, naphthylene diisocyanate, and bis(isocyanatomethyl)cyclohexane. According to exemplary embodiments, the polyisocyanate component includes TDI or MDI, e.g., available from The Dow Chemical Company under the tradenames VORANATE and ISONATE. For example, the polyisocyanate component may include a mixture of different isomers of TDI or MDI, such as a mixture including from 60% to 85% of the 2,4'- isomer of TDI and 15% to 40% of the 2,6'- isomer of TDI.

The foam forming additive component may include at least a tin catalyst (i.e., a tin based catalyst). Exemplary tin based catalysts include stannous octoate, stannous carboxylate, stannic chloride, stannous chloride, stannous oleate, dimethyltin dilaurate, dibutyltin dilaurate, and other tin compounds of the formula $SnR_n(OR)_{4-a}$, wherein R is an alkyl or aryl group and n is 0-2. An exemplary tin based catalyst includes DibutylTinDilaurate (DBTDL), but DBTDL may not be suitable for use in flexible slabstock foam (e.g., because of toxicity issues and it does not degrade during foaming hence catalyze retro-reactions during foam aging, thus leading to foams with poor aging characteristics).

According to an exemplary embodiment, the tin catalyst is stannous octoate. For example, stannous octoate may be the only tin based component in the reaction mixture for forming the conventional flexible foam. The amount of the tin catalyst stannous octoate may be less than 0.15 parts (e.g., less than 0.13 parts, from 0.0001 to 0.14 parts, from 0.01 parts to 0.12 parts, etc.) per 100 parts by weight of the foam forming polyol component. For example, the stannous octoate may break down during foaming and generate free 2-Ethylhexanoic acid and/or 2-Ethylcaproic acid, in the finished foam provides undesired VOC's and has an unpleasant odor. According to embodiments, the amount of the tin catalyst (such as stannous octoate catalyst) used with the PIPA polyol to form the conventional polyurethane foam may be lower than normally used in the art of conventional flexible foams (e.g., used with other polymer polyols such as the SANs polyol) so that a reduction in the volatile organic compounds (VOC) may be realized. For example, the VOC content may be measured in terms of micrograms of the volatile organic compound content per gram of foam using the test method VDA 278 (Thermal Desorption of Organic Emissions for the Characterization of Non-Metallic Materials for Automobiles).

According to an exemplary embodiment, the tin catalyst is a stannous carboxylate, e.g., based on fatty acids with 6 to 18 carbons atom chains, with and without unsaturation such as 2-Ethyl Caproic acid, 2 Butyl Octanoic acid, 2 Hexyl decanoic acid, Oleic acid, Ricinoleic acid, Oleic acid. Use of high molecular weight stannous salts may reduce VOC's but could negatively impact foam aging characteristics or other foam properties.

Although the tin catalyst represents a small portion of the overall weight of the starting materials used to make the conventional flexible foam, a decrease of at least 45% of the total amount of tin catalyst used has been correlated to a significant reduction in 2-Ethylcaproic acid, hence on overall VOC content (e.g., to allow for the finalized product to be labeled as having a low VOC content in view of the current regulations in various countries). Further, the reduction in VOC content (e.g., styrene and 2-Ethylhexanoic acid), has been linked to a reduction in odor of the final foam product. According to embodiments, by the use of the PIPA polyol to form conventional flexible polyurethane foam, VOC content is reduced due to both the reduction in (or exclusion of) the amount of tin catalyst needed and the exclusion of any SANs polyols. Also, by elimination of the SANs polyols, a reduction of odor and 2-ethyl-hexanoic acid content may be realized in the final foam product.

The tin catalyst may be used in conjunction with one or more other catalysts, e.g., at least one blowing catalyst, at least one gelling catalyst, and/or at least one reactive catalyst. For example, the tin catalyst may be used with one or more amine catalysts, e.g., tertiary amine catalysts. Exemplary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine , and dimethylalkylamines where the alkyl group contains from 4 to 18 carbon atoms. Other catalyst that may be used include, e.g., a cyclic amidine catalyst, a tertiary phosphine catalyst, a metal chelate based catalyst, acid a metal salt base catalyst, and/or a metal salt of organic acid based catalyst. Exemplary embodiments may include auto-catalytic polyols used in conjunction with the tin catalysts and optionally in conjunction with the one or more other catalysts.

The foam forming additive component may include at least one optional blowing agent. Exemplary blowing agents include water, methylene chloride, carbon dioxide, low-boiling chlorofluorocarbons, fluorocarbons, and hydrocarbons. For example, water may be used in an amount from 0.0001 parts to 7.0 parts (e.g., 0.01 parts to 6.0 parts, 2.5 parts to 5.0 parts, etc.) by weight per 100 parts by weight of the foam forming polyol component.

A methylene chloride based blowing agent may be used in an amount from 3 parts to 30 parts (e.g., 5 parts to 15 parts, 5 parts to 10 parts, etc.) by weight per 100 parts by weight of the foam forming polyol component. According to an exemplary embodiment, the foam product may be produced under vacuum at variable pressure foaming (VPF) according to the desired foam properties. The foam forming additive component may include at least one optional foam-stabilizing surfactant, e.g., that helps stabilize the gas bubbles formed by the blowing agent during the foaming process. For example, the foam-stabilizing surfactant may be a silicone surfactant that is known in the art (such as an organosilicone surfactant). The foam forming additive component may include a crosslinker, a chain extender, a cell opener, a filler (such as melamine and/or calcium carbonate), a flame retardant, a pigment, a colorant, a reinforcing agent, a biocide, a preservative, and/or an antioxidant.

The conventional flexible polyurethane foam formed using the PIPA polyol and a lesser amount of tin based catalyst, according to embodiments, has excellent properties, including foam aging, over a range of solids content and densities (15 kg/m$^3$ and 50 kg/m$^3$) of the resultant foams, e.g., compared to a conventional flexible foam formed using the SANs polyol and a greater amount of tin catalyst. For example, a blow off time may be less than 130 seconds, a compression force deflection at a deflection of 40% may be greater than 4.0 kPa, and/or a tear strength may be at least 295 N. Foam resiliency is below 45%.

With respect to forming the PIPA polyol for use in forming the conventional polyurethane foam, a reaction mixture is prepared that includes at least the low equivalent weight polyol, the polyisocyanate component, the base polyol (e.g., that is a liquid polyether polyol at 23° C.), and at least one catalyst such as a tin-free catalyst for environmental reasons. The tin-free catalyst substantially excludes any tin so as to be referred to as tin-free. Exemplary tin-free catalysts include tertiary amines and zinc or bismuth salts, for instance zinc ricinoleate (Kosmos 54, available from Evonik). The amount of the tin-free catalyst used may be from 0.01 wt % to 1 wt % (e.g., from 0.02 wt % to 0.5 wt %, 0.02 wt % to 0.1 wt %, etc.) based on the total weight of PIPA-forming reactants. According to an exemplary embodiment, the reaction mixture for forming the PIPA polyol substantially excludes any tin based catalysts, e.g., includes only one or more tin free catalysts such as a zinc catalyst (e.g., a zinc carboxylate catalyst). As discussed in, e.g., U.S. Pat. No. 6,576,682 (see table 4) such a type of catalyst may a very mild effect on the breathability of polyurethane foams compared to Stannous Octoate.

The reaction mixture may be agitated and the low equivalent weight polyol and the base polyol may react with the polyisocyanate component to form the PIPA polyol (e.g., in the form of a dispersion). Ultimately the reaction mixture may include 1 to 30 (e.g., 1 to 20, 5 to 15, 6.5 to 9.5, etc.) parts by weight of the low equivalent weight polyol, 1 to 50 (e.g., 1 to 30, 5 to 20, 10 to 15, etc.) parts by weight of the polyisocyanate, and 100 parts by weight of the base polyol.

The polyol component for forming the PIPA polyol includes the low equivalent weight polyol, which has a number average hydroxyl equivalent weight of less than 80 g/mole equivalence (e.g., less than 75, from 50 to 75, etc.). The low equivalent weight polyol may have from 2 to 6 hydroxyl groups (e.g., 2 to 4, 2 to 3, etc.) per molecule. The low equivalent weight polyol may include at least two primary hydroxyl groups per molecule and any optional additional hydroxyl groups may be secondary hydroxyl groups. In the PIPA polyol, the low equivalent weight polyol may be dispersed in the base polyol in the form of small droplets. A large excess of low equivalent weight polyol may not be necessary and the amount of low equivalent weight polyol used may be sufficient to consume the isocyanate groups provided in the reaction mixture. For example, the index for forming the PIPA polyol may be from 30 to 200 (e.g., 30 to 175, 30 to 150, 40 to 125, 40 to 120, 50 to 110, 90 to 105, etc.) for equivalents of the hydroxyl groups of the low equivalent weight polyol per equivalent of isocyanate groups. The isocyanate index is measured as the equivalents of isocyanate in the reaction mixture for forming the PIPA polyol, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage.

In terms of weight, the low equivalent weight polyol may be used in an amount from 1 part to 50 parts (e.g., 2 parts to 30 parts, 3 parts to 15 parts, 3 parts to 10 parts, 3 parts to 7 parts, etc.) by weight per 100 parts by weight of the base polyol. Exemplary low equivalent weight polyols include ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, and sucrose. Exemplary other amines include diethanolamine, triethanolamine, triisopropanolamine, and diisopropanolamine. For example, triethanolamine may be used by itself or as a mixture with one or more of the foregoing (such a blend including 75 wt % to 99.9 wt % of triethanolamine and 0.01 wt % to 25 wt % of another low molecular weight polyol having a number average hydroxyl equivalent weight of less than 80, based on a total weight of the blend). The at least one other polyol or amine may account for from 0 wt % to 25 wt % of the total weight of the polyol component.

Another option is to combine the low molecular weight polyol with an amine such as a secondary or a primary amine to introduce polyureas (PHD) moieties in the PIPA particles. For example, a primary amine may be used. Examples include dicyclohexylamine (DCHA), cyclohexylamine (CHA), ethylene diamine (EDA), isophorone diamine (IPDA), trisaminopropylamine, Laromine™ from BASF, and Jeffamine® polyetheramines from Huntsman. Since primary amines react faster than TEOA with the isocyanate, they may be considered as "in situ seeds" for the formation of fine PIPA particles.

The polyisocyanate component for forming the PIPA polyol, which is separately provided from the foam forming polyisocyanate component, includes at least one polyisocyanate compound having a number average isocyanate equivalent weight that is less than 225 g/mole equivalence (e.g., less than 175 g, from 50 g to 175 g, from 70 g to 150 g, etc.). The polyisocyanate component compound may be an aromatic, a cycloaliphatic, or an aliphatic polyisocyanate. Exemplary polyisocyanates include m-phenylene diisocyanate (MDI), toluene diisocyanate (TDI), hexamethylene diisocyanate (HDI), tetramethylene diisocyanate, cyclohexan diisocyanate, hexahydrotoluene diisocyanate, naphthylene diisocyanate, and bis(isocyanatomethyl)cyclohexane. The polyisocyanate component and the foam forming polyisocyanate component may have the same composition. According to exemplary embodiments, the polyisocyanate component includes TDI or MDI, e.g., available from The Dow Chemical Company under the tradenames VORANATE and ISONATE. For example, the polyisocyanate component may include a mixture of different isomers of TDI or MDI, such as a mixture including from 60% to 85% of the 2,4'-isomer of TDI and 15% to 40% of the 2,6'isomer of TDI.

The base polyol for forming the PIPA polyol includes at least one liquid polyether having a hydroxyl equivalent weight from 200 g/mole equivalence to 1500 g/mole equivalence (e.g., from 250 to 1400, from 400 to 1300, from 800 to 1250, etc.). The hydroxyl groups of the base polyol are mainly secondary hydroxyls and may include only minor amounts of primary hydroxyls. At least 80%, at least 85%, at least 90%, at least 92%, at least 95%, and/or at least 98% of the total amount of hydroxyl groups in the base polyol are secondary hydroxyls. Conversely, the base polyol may contain no more than 20%, no more than 15%, no more than 10%, no more than 8%, no more than 5%, and/or no more than 2% of primary hydroxyls based on the total amount of hydroxyl groups in the base polyol. For example, the base polyol may be a polyoxypropylene carrier polyol or a polyoxypropylene-polyoxyethylene carrier polyol having a low ethylene oxide content (e.g., less than 12 wt % based on a mixed feed). The base polyol may have a nominal hydroxyl functionality of at least 2.0 (e.g., may be a diol or a triol). For example, the nominal hydroxyl functional is at least 2.5, at least 3.0, from 2.5 to 6.0, and/or from 2.5 to 4.2. The number average hydroxyl equivalent weight of the base polyol may be from 205 g/mole equivalents to 1500 g/ mole equivalents (e.g., 300 to 1400, 500 to 1300, 600 to 1350, 700 to 1200, 900 to 1100, etc.). If the base polyol is a mixture of two or more separately made base polyols, the base polyols independently have an average hydroxyl equivalent weight from 200 to 6000.

The base polyol may be a polyether polyol that is a homopolymer or copolymer that includes propylene oxide. For example, the base polyol may be a polymer of propylene oxide that includes from 0% to about 10% (e.g., 0 to 2%, etc.) of primary hydroxyl groups based on the total amount of hydroxyl groups in the homopolymer of propylene oxide. The selection of a catalyst for forming the base polyol may have an effect on the percentage of primary hydroxyl groups present in the resultant base polyol. For example, propylene oxide based homopolymers made with alkali metal catalysts may include less than 2% primary hydroxyl groups, whereas propylene oxide based homopolymers made using double metal cyanide catalyst complexes may have up to approximately 8% primary hydroxyl groups, based on the total amount of hydroxyl groups in the homopolymer of propylene oxide. According to an exemplary embodiment, the base polyol is triol that is a polyoxypropylene homopolymer having a hydroxyl equivalent weight of 900 to 1350 and having 95% to 100% of secondary hydroxyl groups.

Exemplary copolymers include random copolymers of propylene oxide and ethylene oxide that are prepared by polymerizing a mixture of propylene oxide and ethylene oxide (e.g., to form polyoxypropylene-polyoxyethylene copolymers having a polyoxyethylene content from 0.5 wt % to 30 wt %, 0.5 wt % to 20 wt %, and/or 0.5 wt % to 15 wt %). Another exemplary copolymer includes block copolymers containing one or more internal blocks of polymerized of one of propylene oxide and ethylene oxide and terminal blocks of the other of propylene oxide and ethylene oxide. The terminal block may account for 0.5 wt % to 30 wt %, 0.5 wt % to 20 wt %, and/or 0.5 wt % to 15 wt % of the block copolymer. According to an exemplary embodiment, the base polyol is a triol that is a copolymer (e.g., random copolymer or block copolymer) of 80 wt % to 99.5 wt % of polyoxypropylene and 0.5 wt % to 20 wt % of polyoxyethylene having a hydroxyl equivalent weight of 900 to 1350 and having 95% to 100% secondary hydroxyl groups.

The base polyol may be prepared by polymerizing the propylene oxide, ethylene oxide, and/or butylene oxide in the presence of an initiator compound or mixture of initiator compounds. The initiator may include at least two oxyalkylatable hydrogen atoms. Hydroxyl groups, primary amine groups, secondary amine groups, and thiol groups are examples of groups that contain oxyalkylatable hydrogen atoms. Exemplary initiators are glycerin, water, ethylene glycol, propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, and propane diamine. Mixtures of two or more of the foregoing initiators may be used. For example, the initiator may be glycerin.

The mixture for forming the PIPA polyol may further include the optional additive component (which in some exemplary embodiments may be excluded) that includes a stabilizer (including, for example, a non-silicone based stabilizer that is different from the PIPA polyol) and/or water. The mixture may include the stabilizer in an amount from 0 wt % to 10 wt % and/or and the water in an amount from 0 wt % to 2 wt %, based on a total weight of the agitated mixture. Without intending to be bound by this theory, by including the stabilizer and/or small amounts of water, stable PIPA polyols that have low viscosities and small particle sizes dispersed in the base polyol, which has primarily secondary hydroxyl groups, may be formed for use in producing conventional foams.

The stabilizer, if used, may be a non-silicone based compound and that is not a previously formed PIPA polyol (e.g., is not a seed PIPA polyol). The stabilizer may include a functionalized polyether that is a linear or branched polyether having at least one polyether segment with a molecular weight of 200 to 8000. The functionalized polyether may have at least one end that is independently terminated with an isocyanate group or an isocyanate-reactive group linked to the functionalized polyether through, for example, a urea group and/or urethane group. The isocyanate-reactive group may be, for example, a hydroxyl group, a primary amino group, a secondary amino group or an epoxy group. All or a portion of the functionalized polyether may include at least one selected from the group of a biuret group, an isocyanurate group, a urea group, and an allophanate group.

For example, the functionalized polyether may have the following structure:

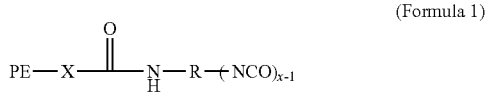

(Formula 1)

In Formula 1, R represents the residue, after removal of an isocyanate group, of a polyisocyanate having the structure R-(NCO)$_x$. Further, x in Formula 1 and in R-(NCO)$_x$ represents the number of initial isocyanate groups in the polyisocyanate compound used to make the functionalized polyether (e.g., x may be an number from 2 to 6). In Formula 1, PE represents a polyether chain having a molecular weight from 200 to 8000 and X represents an oxygen atom or an NH group. For example, PE may be the residue, after reaction with an isocyanate group, of a polyether monol or a polyether monoamine. The monol or monoamine may be prepared by polymerization of the propylene oxide, ethylene oxide, butylene oxide, and/or tetrahydrofuran in the presence of an initiator compound (such as methanol, ethanol, propanol, butanol, hexanol, phenol, and/or benzyl alcohol).

The functionalized polyether shown in Formula I can be prepared in a reaction of a starting polyisocyanate with a monofunctional polyether. The monofunctional polyether has a molecular weight of 200 to 8000, and contains one isocyanate-reactive group per molecule. The isocyanate-reactive group may be, for example, a hydroxyl group, a primary or secondary amino group, a thiol group or an epoxy group. The polyether preferably is a polyether monol or polyether monoamine. The monofunctional polyether preferably has a molecular weight of 400 to 6000, more preferably 600 to 4000, still more preferably 700 to 3000 and in some embodiments 1000 to 3000. Polyether monols are preferred. The polyether may be linear or branched, but linear polyethers are preferred.

The isocyanate groups of foregoing functionalized polyethers can be capped with a compound that replaces the isocyanate groups with one or more isocyanate-reactive groups. Such a capping compound may be, for example, a polyol or aminoalcohol, each of which replaces the isocyanate groups with hydroxyl groups. The isocyanate-reactive groups are linked to the polyether segment of the functionalized polyether through one or more urea and/or urethane groups.

Thus, according to another exemplary embodiment, the functionalized polyether may have the following structure:

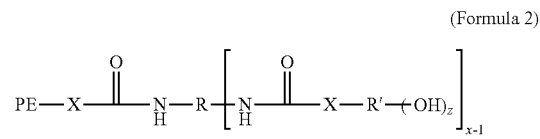

(Formula 2)

In Formula 2, PE represents a polyether chain having a molecular weight from 200 to 8000, X represents an oxygen atom or an NH group, R' represents residue after removal of hydroxyl or amino groups of a polyol or aminoalcohol, and z may be a number from 1 to 5, from 1 to 2, etc.

According to another exemplary embodiment, the functionalized polyether may have the following structure:

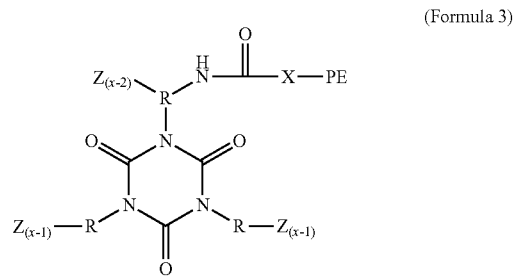

(Formula 3)

In Formula 3, PE represents a polyether chain having a molecular weight from 200 to 8000, X represents an oxygen atom or an NH group, R represents the residue, after removal of an isocyanate group, of a polyisocyanate having the structure R-(NCO)$_x$, R' represents residue of a polyol capping agent, and z may be a number from 1 to 5, from 1 to 2, etc. Further, Z independent represents one of the following structures (except that at least one Z in Formula 3 is represented by Formula 4):

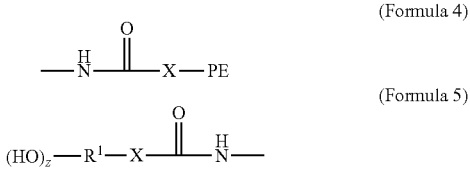

The reaction mixture for preparing the stabilizer may include the at least one polyisocyanate compound and the polyether (PE) at a weight ratio of 10:90 to 90:10. The resultant product of the reaction mixture may include one or more isocyanurate compounds containing at least one polyether segment having a molecular weight from 500 to 5000 (e.g., 700 to 3000, 700 to 2000, etc.) and having an isocyanate content of at least 0.8% by weight. According to an exemplary embodiment, the stabilizer may be included in an amount from 0.1 parts to 15 parts (e.g., 0.5 parts to 10 parts, 2.5 parts to 10 parts, 5 parts to 10 parts, etc.) by weight per 100 parts by weight of the base polyol. In the PIPA polyol, isocyanate groups of the stabilizer may react with the low equivalent weight polyol to graft the isocyanate-containing species to the PIPA particles.

The PIPA polyol may be prepared in the presence of water, e.g., from 0 wt % to 2 wt %, 0 wt % to 0.5 wt %, and/or 0 wt % to 0.15 wt %, based on the total weight of the agitated mixture. The water, when present, may be carried into the process as an impurity in the base polyol, which as industrial products could potentially contain from 0.01 wt % to 0.25 wt % of water based on a total weight of the commercially available polyol product. Accordingly, reduction and/or minimization of the water carried into the reaction system as an impurity is sought and a process of adding additional water to the reaction system may be excluded.

The process for making the PIPA polyol may be performed in a batch-wise process, in a semi-batch process, or in a continuous process. The base polyol, the polyisocyanate, the low equivalent weight polyol, may be added in any order to the reaction mixture. For example, to form the PIPA polyol the reaction of the low equivalent weight polyol with the polyisocyanate may occur in the presence of the base polyol and the stabilizer, or a pre-reaction between the base polyol and the polyisocyanate may be performed and the low equivalent weight polyol may be added to the thereafter.

For example, when forming a pre-reaction mixture, the process may include combining 1 part to 50 parts by weight of the polyisocyanate compound having an average isocyanate equivalent weight that is less than 225 and 100 parts by weight of the liquid base polyether polyol having an average hydroxyl equivalent weight of at least 200 and at least 80% of secondary hydroxyl groups. The polyisocyanate reacts with the polyether polyol while mixing to produce a pre-reaction mixture containing unreacted base polyol, unreacted polyisocyanate compound, and one or more isocyanate group-containing adducts of the base polyol with the polyisocyanate. Then, the low equivalent weight polyol having an average hydroxyl equivalent weight of less than 80 and optionally additional polyisocyanate are dispensed into the pre-reaction mixture, e.g., enough of the low equivalent weight polyol may be provided to consume the isocyanate groups in the pre-reaction mixture. For example, 1 to 30 parts of the low equivalent weight polyol is added. The low equivalent weight polyol reacts with the isocyanate groups to form polyisocyanate polyaddition particles dispersed in the base polyol (i.e., the liquid base polyether polyol). The pre-reaction may be formed by continuously bringing the liquid base polyether polyol and the polyisocyanate together in a mixhead to form a mixture that is continuously introduced into a tubular reactor, and the low equivalent weight polyol and the optional additional polyisocyanate may be added downstream of the tubular reactor.

The PIPA-forming reaction may be performed at a temperature of, e.g., 0° C. to 100° C. (e.g., 10° C. to 70° C., 20° C. to 60° C., etc.). An elevated temperature may be desirable to reduce reaction time, but may not be necessary (e.g., based on the use of a proper catalyst). The mixture is then allowed to react. Cooling can be applied if necessary to prevent excessive temperature increases due to the exothermic heat of reaction.

If the stabilizer contains isocyanate groups or is added as a mixture with one or more other isocyanate-containing compounds, it may be combined with the polyisocyanate (if additional polyisocyanate is needed) and the resulting combination introduced together into the PIPA polyol-forming process. According to other exemplary embodiments, the stabilizer may be introduced separately from the polyisocyanate, in either order or simultaneously. The low equivalent weight polyol may be introduced prior to, simultaneously with, or after an isocyanate-containing stabilizer and additional polyisocyanate (if any is added).

According to exemplary embodiments, an additional stage of filtering the PIPA polyol and/or stripping the PIPA polyol may be avoided. For example, in the PIPA polyol the formation of unstable agglomerates may be avoided, thus a filtration process may be excluded. In contrast, when forming SANs polyols, upon completion of the reaction, the polyol may be stripped or otherwise treated, e.g., to remove unreacted materials and/or volatile reaction by-products. Stripping may be performed, e.g., by applying vacuum with an elevated temperature, and a stripping agent may be bubbled through the product to facilitate removal of these materials. Filtering of the SANs polyols may be necessary due to the presence of unstable agglomerates.

According to embodiments, the conventional foams may be made using PIPA polyols made according to the embodiments discussed in U.S. Provisional Application No. 61/877,287 (filed on Sep. 13, 2013, and incorporated herein by reference). According to other embodiments, the conventional foams may be made using PIPA polyols made according to the embodiments discussed in U.S. Provisional Application No. 61/877,290 (filed on Sep. 13, 2013, and incorporated herein by reference). For example, the polyurethane foams may be made using at least one PIPA polyol, which is selected from the PIPA Polyol A to the PIPA Polyol J discussed below. According to exemplary embodiments, various combinations of PIPA Polyol A to PIPA Polyol J may be used.

PIPA Polyol A has a solids content of approximately 20% in a carrier polyol, a number average molecular weight of approximately 3000 g/mol, and at least 90% of secondary hydroxyl groups. The exemplary PIPA Polyol is prepared by mixing in a first vessel, at room temperature, approximately two parts by weight of the TDI Isocyanate with two parts by weight of a linear mono-functional block copolymer (having approximately 80 to 90% of propylene oxide and approximately 10% to 20% of ethylene oxide, and a molecular weight of at least 1000 and no more than 1800 g/mole) in the presence of a catalyst (e.g., examples are available from Air Products as Polycat® 45 and Polycat® 46). The reaction is allowed to proceed for a couple of hours and may then be reacted with an excess of triethanolamine (TEOA). In a second vessel, at room temperature, approximately 9 parts by weight of the Isocyanate with 72 parts by weight of a polyoxypropylene polyether triol (having a number average molecular weight of approximately 3000 g/mole) is prepared in a high speed laboratory mixer. Thereafter, approximately 6.8 to 7.2 parts by weight of triethanolamine, approximately 0.15 to 0.3 parts by weight of a zinc carboxylate catalyst, and approximately 1.8 to 2.2 parts by weight of the reaction product from the first vessel is added over sixty seconds with continued stirring to prepare the exemplary PIPA Polyol A. The resultant PIPA Polyol A may be a stable PIPA polyol with 20% solids and particle size below 10 microns.

PIPA Polyol B has a solids content of approximately 20% in a carrier polyol, a number average molecular weight of approximately 3000 g/mol, and at least 90% of secondary hydroxyl groups, and is formed using the process described with respect to PIPA Polyol A, above, premixing the stabilizer with the isocyanate when producing the PIPA polyol. The resultant PIPA Polyol B may be a stable PIPA polyol with 20% solids and particle size below 10 microns.

PIPA Polyol C has a solids content of approximately 20% in a carrier polyol, a number average molecular weight of approximately 3000 g/mol, and at least 90% of secondary hydroxyl groups, and is formed using the process described with respect to PIPA Polyol A, above, except using Polycat® 41, Dabco® TMR, Dabco TMR-2, and/or Dabco TMR-30 as the catalyst. The resultant PIPA Polyol C may be a stable PIPA polyol with 20% solids and particle size below 10 microns.

PIPA Polyol D has a solids content of approximately 20% in a carrier polyol, a number average molecular weight of approximately 3000 g/mol, and at least 90% of secondary hydroxyl groups, and is formed using the process described with respect to PIPA Polyol A, above, except using one part of the isocyanate with 2 to 4 parts of the linear monofunctional block copolymer. The resultant PIPA Polyol D may be a stable PIPA polyol with 20% solids and particle size below 10 microns.

PIPA Polyol E has a solids content of approximately 20% in a carrier polyol, a number average molecular weight of approximately 3000 g/mol, and at least 90% of secondary hydroxyl groups, and is formed using the process described with respect to PIPA Polyol A, except using a linear monofunctional block copolymer with 100% PO, containing approximately 0.2 parts water. The resultant PIPA Polyol E may be a stable PIPA polyol with 20% solids and particle size below 10 microns.

PIPA Polyol F is similar to PIPA Polyol E, except contains an additional small amount of PHD particles obtained with 0.1 to 1 part of a primary amine as a co-reactant with TEOA.

PIPA Polyol G has a solids content of approximately 20% in a carrier polyol, a number average molecular weight of approximately 3000 g/mol, and at least 90% of secondary hydroxyl groups, and is formed using a process consisting of premixing the polyol with the zinc carboxylate catalyst, adding TDI as the isocyanate, stirring for 60 to 120 seconds at room temperature to let the reaction start, pouring TEOA in the reactive blend still under stirring, and continuing mixing for another 5 to 10 minutes. The resultant PIPA Polyol G may be a stable PIPA polyol with 20% solids and particle size below 10 microns.

PIPA Polyol H has a solids content of approximately 20% in a carrier polyol, a number average molecular weight of approximately 3000 g/mol, and at least 90% of secondary hydroxyl groups using the process consisting of premixing the polyol with Dabco 33 LV or Niax™ A-33 as the catalyst, adding the TDI isocyanate, stirring for 60 to 120 seconds at room temperature to let the reaction start, pouring TEOA in the reactive blend still under stirring, and continuing mixing for another 5 to 10 minutes. The resultant PIPA Polyol H may be a stable PIPA polyol with 20% solids and particle size below 10 microns.

PIPA Polyol I has a solids content of approximately 20% in a carrier polyol, a number average molecular weight of approximately 3000 g/mol, and at least 90% of secondary hydroxyl groups using the process described with respect to PIPA Polyol F, except polymeric MDI is used as the isocyanate. The resultant PIPA Polyol I may be a stable PIPA polyol with 20% solids and particle size below 10 microns.

PIPA Polyol J is similar to PIPA Polyol H and PIPA Polyol I, except contains an additional small amount of PHD particles obtained with 0.1 to 1 part of a primary amine as a co-reactant with TEOA.

All parts and percentages are by weight unless otherwise indicated. The terms combustion-modified, flame resistant, and similar terms as used herein refer to a material's performance in laboratory flammability tests, and are not meant to describe performance under actual fire conditions.

EXAMPLES

The following materials are principally used:

| | |
|---|---|
| Isocyanate | A toluene diisocyanate (TDI) mixture of 80 wt % 2,4'-toluene diisocyanate and 20 wt % 2,6'-toluene diisocyanate (available as VORANATE ™ T80 from The Dow Chemical Company). |
| Polyol A | A polyol that is a polyoxypropylene polyether triol, having a number average molecular weight of approximately 3000 g/mole (available as VORANOL ™ WK 3138 from The Dow Chemical Company). Fewer than 10% of the hydroxyl groups of Polyol A are primary hydroxyl groups. |
| SAN Polyol | A SAN polymer polyol containing 40% of solids and an approximately 3000 number average molecular weight feedstock triol (available as VORALUX ™ HL 400 from The Dow Chemical Company). |
| Silicone Surfactant | An organosilicone surfactant (available as Niax ™ L-620 from Momentive) |
| Tin Catalyst | Stannous Octoate (available as Dabco ® T9 from Air Products) |
| Niax ™ A-1 | An amine based blowing catalyst including 70% of bis(2-dimethylaminoethyl) ether (available from Momentive). |
| Dabco ® 33 LV | An amine based gelling catalyst including a 33 wt % solution of triethylenediamine in dipropylene glycol (available from Air Products). |

An exemplary PIPA Polyol used herein has a solids content of 20% in a carrier polyol having a number average molecular weight of approximately 3000 g/mol. The carrier polyol is made by polymerizing alkylene oxides with a potassium hydroxide polymerization catalyst. It contains and at least 98% of secondary hydroxyl groups. The PIPA polyol is made by reacting triethanolamine with toluene diisocyanate in the presence of the carrier polyol, a zinc carboxylate urethane catalyst and a stabilizer. No tin catalyst is present. The viscosity of the exemplary PIPA polyol is about 2.500 mPa*s (20° C.) and 90% of particles, by volume, are smaller than 5 μm.

Examples 1 to 9 and Comparative Examples A to F are prepared in a slabstock forming process according to the formulations in Table 1 and Table 2, below. In particular the polyol component (which includes the PIPA polyol, the SAN Polyol, and/or Polyol A), the additives (i.e., surfactant and amine catalysts), and the water are mixed with the Isocyanate, according to the formulations in Table 1 and Table 2. Thereafter, properties of the resultant foam samples are measured, as discussed below. The components for the formulations in Table 1 and Table 2 are accurately weighed in containers of suitable capacity, and the Isocyanate is weighted separately. All components are maintained at room temperature (approximately 20° C.) during weighing and processing. A bench static mixer is used to prepare the samples in three stages. In the first stage, a premix that includes the polyols and additives is prepared. In the second stage, the Tin Catalyst is mixed with the premix. In the third stage, the Isocyanate is added to the premix to form a reaction mixture (formation of the reaction forming mixture is regarded as the time when the reaction starts, i.e., t0). The reaction mixture is then poured into a suitable container and allowed to rise to form foam samples. Then, the foam samples are annealed in an oven for 5 min and allowed to further cure for 24 hours at ambient temperature, before testing.

Referred to Table 1, below, Examples 1 to 4 and Comparative Examples A to D have an overall solids content of 20% in the polyol component.

Referring to Table 1, above, Example 2 has a relatively lower airflow value coupled with a comparatively higher compression set value.

Referring to Table 2, below, Examples 5 and 6 and Comparative Examples E and F have an overall solids content of 10% in the polyol component.

TABLE 2

|  | Ex. 5 | Ex. 6 | Ex. E | Ex. F |
|---|---|---|---|---|
| PIPA Polyol | 50.0 | 50.0 | — | — |
| SAN Polyol | — | — | 25.0 | 25.0 |
| Polyol A | 50.0 | 50.0 | 75.0 | 75.0 |
| Tin Catalyst | 0.12 | 0.12 | 0.24 | 0.24 |
| NIAX ™ A-1 | 0.04 | 0.04 | 0.04 | 0.04 |
| DABCO 33LV | 0.08 | 0.08 | 0.08 | 0.08 |
| Silicone Surfactant | 1.2 | 1.2 | 1.2 | 1.2 |
| Water | 4.65 | 4.65 | 4.65 | 4.65 |
| Isocyanate Index | 105 | 115 | 105 | 115 |
| Percent Solids | 10 | 10 | 10 | 10 |
| Density (kg/m$^3$) | 24.5 | 25.6 | 23.6 | 23.6 |
| CFD @ 40% (kPa) | 5.1 | 6.5 | 4.7 | 6.4 |
| Tear Strength @ 23 C (N) | 406 | 323 | 416 | 310 |
| Resilience (%) | 29.3 | 29.3 | 29.0 | 24.8 |
| Airflow (scfm) | 1.8 | 1.8 | 1.0 | 0.8 |
| Compression Set @ 75% (%) | 16.9 | 23.6 | 34.2 | 21.1 |

Substituting SAN polyol with the PIPA polyol allows for a reduction (e.g., at least 50%) of Stannous Octoate, which leads to a reduction of 2-Ethylcaproic acid content and an elimination of Styrene and Acrylonitrile VOC's in the resultant sample.

The density is measured according to ISO 3386. CFD (i.e., compression force deflection) is a measure of firmness (or stiffness) at a deflection of 40%, and the force to deflect the sample by 40% is measured according to ISO 3386. Tear strength is a measure of the amount of force required to break a foam samples as it is pulled apart, and is measured according to ASTM D 3574. Resilience is measured according to ASTM D 3574. Air flow through the foam is measured according to ASTM D-3574. Compression set at 75% is a measure of the permanent deformation of a foam after it has

TABLE 1

|  | Ex. 1 | Ex. 2 | Ex. 3 | Ex. 4 | Ex. A | Ex. B | Ex. C | Ex. D |
|---|---|---|---|---|---|---|---|---|
| Composition (parts by weight) | | | | | | | | |
| PIPA Polyol | 100 | 100 | 100 | 100 | — | — | — | — |
| SAN Polyol | — | — | — | — | 50.0 | 50.0 | 50.0 | 50.0 |
| Polyol A | — | — | — | — | 50.0 | 50.0 | 50.0 | 50.0 |
| Tin Catalyst | 0.12 | 0.12 | 0.09 | 0.09 | 0.24 | 0.24 | 0.18 | 0.18 |
| NIAX ™ A-1 | 0.04 | 0.04 | 0.08 | 0.08 | 0.04 | 0.04 | 0.05 | 0.05 |
| DABCO ® 33LV | 0.08 | 0.08 | 0.08 | 0.08 | 0.08 | 0.08 | 0.10 | 0.10 |
| Silicone Surfactant | 1.2 | 1.2 | 1.0 | 1.0 | 1.2 | 1.2 | 1.0 | 1.0 |
| Water | 4.65 | 4.65 | 3.55 | 3.55 | 4.65 | 4.65 | 3.55 | 3.55 |
| Composition Properties | | | | | | | | |
| Isocyanate Index | 105 | 115 | 105 | 115 | 105 | 115 | 105 | 115 |
| Percent Solids | 20 | 20 | 20 | 20 | 20 | 20 | 20 | 20 |
| Foam Properties | | | | | | | | |
| Density (kg/m$^3$) | 23.9 | 23.8 | 28.5 | 29.4 | 23.7 | 23.4 | 29.0 | 28.1 |
| CFD @ 40% (kPa) | 6.7 | 8.0 | 6.6 | 8.7 | 6.6 | 8.8 | 6.7 | 6.8 |
| Tear Strength (N) | 351 | 348 | 356 | 297 | 387 | 311 | 556 | 428 |
| Resilience (%) | 23.3 | 24.8 | 30.3 | 29.0 | 26.3 | 22.3 | 29.8 | 28.0 |
| Airflow (scfm) | 2.0 | 0.3 | 4.0 | 3.0 | 1.9 | 1.8 | 3.6 | 1.7 |
| Compression Set @ 75% (%) | 8.6 | 30.2 | 7.0 | 8.9 | 27.6 | 26.7 | 5.6 | 14.3 | been compressed to 75% of its original thickness between two metal plates for a controlled time period and temperature condition, and is measured according to ISO 1856.

The invention claimed is:

1. A process for forming a flexible polyurethane foam, the process comprising:
providing a polyol component including 1) a PIPA polyol that is a dispersion having a solids content from 15% to 75 wt %, based on a total weight of the PIPA polyol, the PIPA polyol being prepared in the absence of a tin catalyst from a reaction product of a first mixture including at least a low equivalent weight polyol having a number average hydroxyl equivalent weight of less than 80, a polyisocyanate compound having a number average isocyanate equivalent weight that is less than 225, and a liquid base polyether polyol having a number average hydroxyl equivalent weight from 200 to 1500 and at least 90% of secondary hydroxyl groups based on a total amount of hydroxyl groups in the liquid base polyether polyol and 2) a polyoxypropylene-polyoxyethylene polyether triol having a molecular weight from 3000 to 3500, having a polyoxyethylene content that is less than 15 wt % based on the total weight of polyoxyethylene and polyoxypropylene in the polyoxypropylene-polyoxyethylene polyether triol, and having less than 10% primary hydroxyl groups, based on the total amount of hydroxyl groups in the polyoxypropylene-polyoxyethylene polyether triol, wherein the polyol component has an overall solids content from 2 wt % to 50 wt %, based on the total weight of the polyol component;
providing an isocyanate component that includes at least one polyisocyanate;
providing an additive component that includes a catalyst; and
forming a reaction mixture including the polyol component, the isocyanate component, and the additive component to form a flexible polyurethane foam with a resiliency value below 45%, the reaction mixture having an isocyanate index from 90 to 150.

2. The process as claimed in claim 1, wherein the liquid base polyether polyol is prepared by reacting one or more alkylene oxides in the presence of a potassium hydroxide polymerization catalyst.

3. The process as claimed in claim 1, wherein the polyurethane foam has a density within a range of 10 $kg/m^3$ to 100 $kg/m^3$.

4. The process as claimed in claim 1, wherein the polyurethane foam has a density within a range of 15 $kg/m^3$ to 50 $kg/m^3$.

5. The process as claimed in claim 1, wherein the low equivalent weight polyol is triethanolamine or a blend including triethanolamine and another low equivalent weight polyol having a number average hydroxyl equivalent weight of less than 80.

6. The process as claimed in claim 1, wherein the liquid base polyether polyol is a triol that is a polyoxypropylene homopolymer or a copolymer of 80 wt % to 99.5 wt % of polyoxypropylene and 0.5 wt % to 20 wt % of polyoxyethylene based on the total weight of polyoxyethylene and polyoxypropylene in the liquid base polyether polyol, and the hydroxyl equivalent weight of the liquid base polyether polyol is from 900 to 1350.

7. The process as claimed in claim 1, wherein the first mixture further includes a non-silicone based stabilizer that is different from the PIPA polyol.

8. The process as claimed in claim 1, wherein the first mixture further includes a primary amine as a co-reactant with the low equivalent weight polyol to get PIPA/PHD copolymer based particles.

9. A foam product prepared according to the process as claimed in claim 1.

* * * * *